US008719605B2

(12) United States Patent
Chakra et al.

(10) Patent No.: US 8,719,605 B2
(45) Date of Patent: *May 6, 2014

(54) METHOD FOR DETECTING A TRIGGER TO A PROGRAM NOT ACTIVELY BEING REVIEWED BY THE USER AND PERFORMING A POWER SAVING ACTION WITHOUT PLACING THE DEVICE AS A WHOLE INTO A SLEEP STATE

(75) Inventors: Al Chakra, Apex, NC (US); Itzhack Goldberg, Hadera (IL); Liam Harpur, Dublin (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,994

(22) Filed: May 1, 2012

(65) Prior Publication Data
US 2013/0007487 A1 Jan. 3, 2013

Related U.S. Application Data

(63) Continuation of application No. 13/174,506, filed on Jun. 30, 2011.

(51) Int. Cl.
*G06F 3/041* (2006.01)
*G06F 1/26* (2006.01)
*G06F 1/00* (2006.01)

(52) U.S. Cl.
USPC ............ 713/320; 345/173; 713/340; 713/300

(58) Field of Classification Search
USPC .......... 713/340, 300, 310, 320; 718/104, 102; 345/173
See application file for complete search history.

(56) References Cited

U.S. PATENT DOCUMENTS

| 4,261,037 A | 4/1981 | Hicks |
| 4,399,510 A | 8/1983 | Hicks |
| 5,717,608 A | 2/1998 | Jensen |
| 7,848,900 B2 | 12/2010 | Steinberg et al. |
| 8,131,991 B2 * | 3/2012 | Crisan et al. ................... 713/100 |
| 8,365,175 B2 * | 1/2013 | Angaluri ........................ 718/102 |

(Continued)

FOREIGN PATENT DOCUMENTS

JP 2008152708 7/2008

OTHER PUBLICATIONS

Luo et al., "Power-conscious Joint Scheduling . . . ," www.e.princeton.edu, dated year 2000.

(Continued)

*Primary Examiner* — Thomas Lee
*Assistant Examiner* — Aurel Prifti
(74) *Attorney, Agent, or Firm* — Diana L. Roberts (57) ABSTRACT

A trigger can relate to power usage of a computing device that a computer program to be run or running on the computing device causes. Detection of the trigger causes performance of a power-saving action. The power-saving action relates to the computer program to reduce the power usage of the computing device. The power-saving action is a strictly software-oriented action. An amount of power of the computing device used in detecting the trigger and performing the power-saving action is less than a reduction of the power usage of the computing device that results from performing the power-saving action, resulting in a net power usage reduction.

6 Claims, 5 Drawing Sheets

(56) References Cited

U.S. PATENT DOCUMENTS

| | | | |
|---|---|---|---|
| 8,397,087 B1* | 3/2013 | Gardner et al. | 713/300 |
| 8,438,412 B1* | 5/2013 | Givoly | 713/340 |
| 2004/0268159 A1* | 12/2004 | Aasheim et al. | 713/300 |
| 2007/0150759 A1* | 6/2007 | Srinivasan et al. | 713/300 |
| 2007/0220291 A1* | 9/2007 | Stufflebeam | 713/320 |
| 2007/0220293 A1* | 9/2007 | Takase | 713/320 |
| 2008/0141048 A1* | 6/2008 | Palmer et al. | 713/300 |
| 2008/0313640 A1* | 12/2008 | Liu et al. | 718/104 |
| 2009/0006570 A1 | 1/2009 | Forstall | |
| 2009/0119673 A1* | 5/2009 | Bubba | 718/104 |
| 2009/0259936 A1 | 10/2009 | Tanskanen | |
| 2009/0300399 A1* | 12/2009 | Archer et al. | 713/340 |
| 2009/0309541 A1 | 12/2009 | Walrath | |
| 2009/0327772 A1* | 12/2009 | Lee et al. | 713/300 |
| 2010/0023788 A1* | 1/2010 | Scott et al. | 713/320 |
| 2010/0088707 A1 | 4/2010 | Corn | |
| 2010/0211950 A1 | 8/2010 | Kusko | |
| 2011/0040990 A1* | 2/2011 | Chan et al. | 713/300 |
| 2011/0191609 A1* | 8/2011 | Van Bokhoven et al. | 713/310 |
| 2012/0005490 A1* | 1/2012 | Goraczko et al. | 713/300 |
| 2012/0032894 A1* | 2/2012 | Parivar et al. | 345/173 |
| 2012/0047379 A1* | 2/2012 | Chen et al. | 713/320 |
| 2012/0159209 A1* | 6/2012 | Stemen et al. | 713/320 |

OTHER PUBLICATIONS

Jerry Hom, "Inter-program Compilation for Disk Energy Reduction," Procs. of Workshop on Power-Aware Computer Sys., year 2003.

Shin et al., "Cooperative Voltage Scaling (CVS) between OS and Applications for Low-Power Real-Time Systems", IEEE 2001.

Pereira, "PASA: A Software Architecture . . . ," Procs. of IEEE Workshop, Sep. 2002.

"How to optimize battery power on your laptop," www.microsoft.com, accessed from Internet Jun. 30, 2011.

* cited by examiner

METHOD FOR DETECTING A TRIGGER TO A PROGRAM NOT ACTIVELY BEING REVIEWED BY THE USER AND PERFORMING A POWER SAVING ACTION WITHOUT PLACING THE DEVICE AS A WHOLE INTO A SLEEP STATE

RELATED APPLICATIONS

The present patent application is a continuation of the previously filed and presently pending patent application having the same title, filed on Jun. 30, 2011, and assigned application Ser. No. 13/174,506.

BACKGROUND

With the abundance of computing devices in modern life, individual users as well as entities like businesses and other organizations have begun to focus on the electrical power that these computing devices use. For a portable computing device, such as laptop computer or a mobile device like a smartphone, monitoring power usage is important to preserve the remaining charge of a battery of the device so that a user can use the device for a longer period of time before having to recharge the battery. For a computing device that a user typically plugs into an electrical outlet, such as a desktop computer or even a laptop computer when not running off a battery, monitoring power usage is important to reduce the overall amount of electrical power that the device uses. This latter concern is particularly relevant for large organizations, such as businesses, which may have hundreds, thousands, or more of such computing devices that all use electrical power for which the organizations have to pay a utility company to provide. Furthermore, such usage of power is an environmental concern, particularly where utility companies employ fossil fuels to generate this power.

SUMMARY

A method of an embodiment of the disclosure includes a processor detecting a trigger. The method includes the processor, responsive to detecting the trigger, performing a power-saving action in relation to a computer program to reduce the power usage of a computing device without placing the computing device as a whole into a shutoff, sleep, standby, or hibernation state. The power-saving action is a strictly software-oriented action.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, monitoring power usage of a computing device is important for a variety of different reasons. Such monitoring is part of an overall power management strategy to run the computing device in an efficient manner to reduce power consumption. Existing power management strategies, however, are decidedly hardware-centric in nature.

Specifically, existing hardware-centric power management strategies generally focus on the individual hardware components of a computing device. An under-used processor may turn off individual processing cores so that the processor uses less power, may enter a reduced-power state in-between performing processing tasks, or may perform the processing tasks at a slower rate. An under-accessed hard disk drive may power down its spindle to reduce power usage. An under-accessed memory may refresh at lower frequency to use less power.

When existing power management strategies do consider software, they typically are an "all or nothing" approach. For instance, the operating system of a computing device, in detecting that a user of the device is not currently using any computer program on the device, may cause the computing device to enter a sleep, hibernation or standby, or shutdown state. In the sleep state, the display of the computing device may be off, and the processor and other hardware components may be in a low-power mode. In the hibernation or standby state, a hard disk drive may save the current contents of volatile memory, and the computing device may be off, such that resumption of the computing device results in reloading of the contents of the volatile from the hard disk drive. In the shutdown state, the entire computing device is off The disadvantages to hardware-centric power management strategies include that power management cannot take into account the functionality for which a user is using the computing device. That is, monitoring the individual hardware components of the computing device does not take into account the computer programs that are using these components to perform desired functionality. The disadvantages to existing holistic software-centric power management strategies include that power management cannot take into account individual computer programs running on the computing device. Indeed, if a computing device enters a sleep, hibernation or standby, or shutdown state, no computer programs can function until the device has exited this state.

By comparison, embodiments of the disclosure provide for more granular software-centric power management strategies that overcome these shortcomings. Unlike hardware-centric power management strategies, the software-centric strategies of embodiments of the disclosure can take into account the functionality for which the computing device is being used. Unlike holistic software-centric power management strategies, the more granular software-centric strategies of embodiments of the disclosure can take into account individual computer programs that are being run.

As a first example, a computing device may be running an email messaging computer program that periodically syncs the email messages stored on the computing device with the email messages stored on a mail server communicatively connected to the computing device. A user may be using the computing device, but may not be actively using this computer program. As such, there may be a number of unread email messages, although the computer program still periodically retrieves new messages from the server.

Therefore, in response, embodiments of the disclosure can cause the computer program to enter a hibernation state, or otherwise change the behavior of the computer program. By entering the hibernation state, the computer program causes the computing device to use less power, because the hardware components of the device that the computer program uses to download and store new messages no longer perform this functionality. Even if there are no new messages, the act of checking for additional messages requires the computing device to use power.

Alternatively, embodiments of the disclosure can change the behavior of the computer program so that it checks for and retrieves new email messages less frequently, or completely turn off this functionality, while the remainder of the program still runs. In both these scenarios, the computing device uses less power, but the computing device as a whole does not enter a sleep, hibernation or standby, or shutdown state. For instance, if the user is actively using a different computer program on the computing device, the user can still use this program without issue, since the computing device as a whole is not affected.

In either case, the power-saving action (i.e., causing the computer program to enter hibernation, or changing the behavior of the program) is a strictly software-oriented action. The power-saving action affects the hardware only in the sense that the software requires the computing device to use less power. However, the action does not directly affect the hardware itself. For instance, the action does not directly instruct the processor to enter in a reduced-power state, the action does not directly instruct the hard disk drive to spin down, and so on, although one or more of these effects may nevertheless automatically result from performance of the power-saving action.

As a second example, a number of users may bring their portable computing devices to an in-person meeting within a conference room. In response, embodiments of the disclosure can cause the email messaging computer programs running on these computing devices to cause the computing devices to use less power. The computer programs may enter a hibernation state, or otherwise change their behavior. Embodiments of the disclosure thus detect that the users are not (or should not be) actively using their computing devices, but rather than causing each computing device as a whole to enter a reduced-power state, cause just the email messaging computer programs running on these devices to enter such states.

As a third example, a user of a computing device may initiate the running of a computer program. Embodiments of the disclosure, rather than running this computer program on the user's computing device, may detect that another instance of the computer program is already running on another computing device that is communicatively connected to the user's computing device. As such, the user may be able to run the computer program at the other computing device in a virtualized manner on the user's own computing device. Such virtualization results in the user's computing device using less power than if the computer program were directly running on the user's own computing device.

As a fourth example, embodiments of the disclosure may monitor the running of a computer program on a computing device, and detect that the computer program is causing the computing device to use an inordinate and unusual amount of power, as compared to what is expected. The embodiments in question may notify the user of this situation, and/or take other corrective actions. For instance, these embodiments may diagnostically examine the computer program, either automatically or at user direction, to determine why the program is causing the computing device to use an undue amount of power. The result of such examination may be a recommendation to reinstall the computer program, install an appropriate patch for the computer program, and so on, so that the computer program causes the computing device to use a lesser and more expected or normal amount of power in running the program.

Those of ordinary skill within the art can appreciate that a granular software-centric approach to power management, as embodiments of the disclosure achieve, can and does encompass other examples. In general, the granular software-centric approach to power management of embodiments of the disclosure has the following two characteristics. First, the embodiments detect a trigger. The trigger can be related to the power usage of a computing device (or, more generally, a system) that a computer program running on the device causes. Second, responsive to this trigger, embodiments perform a power-saving action in relation to the computer program to reduce the power usage of the computing device.

Figure 1:
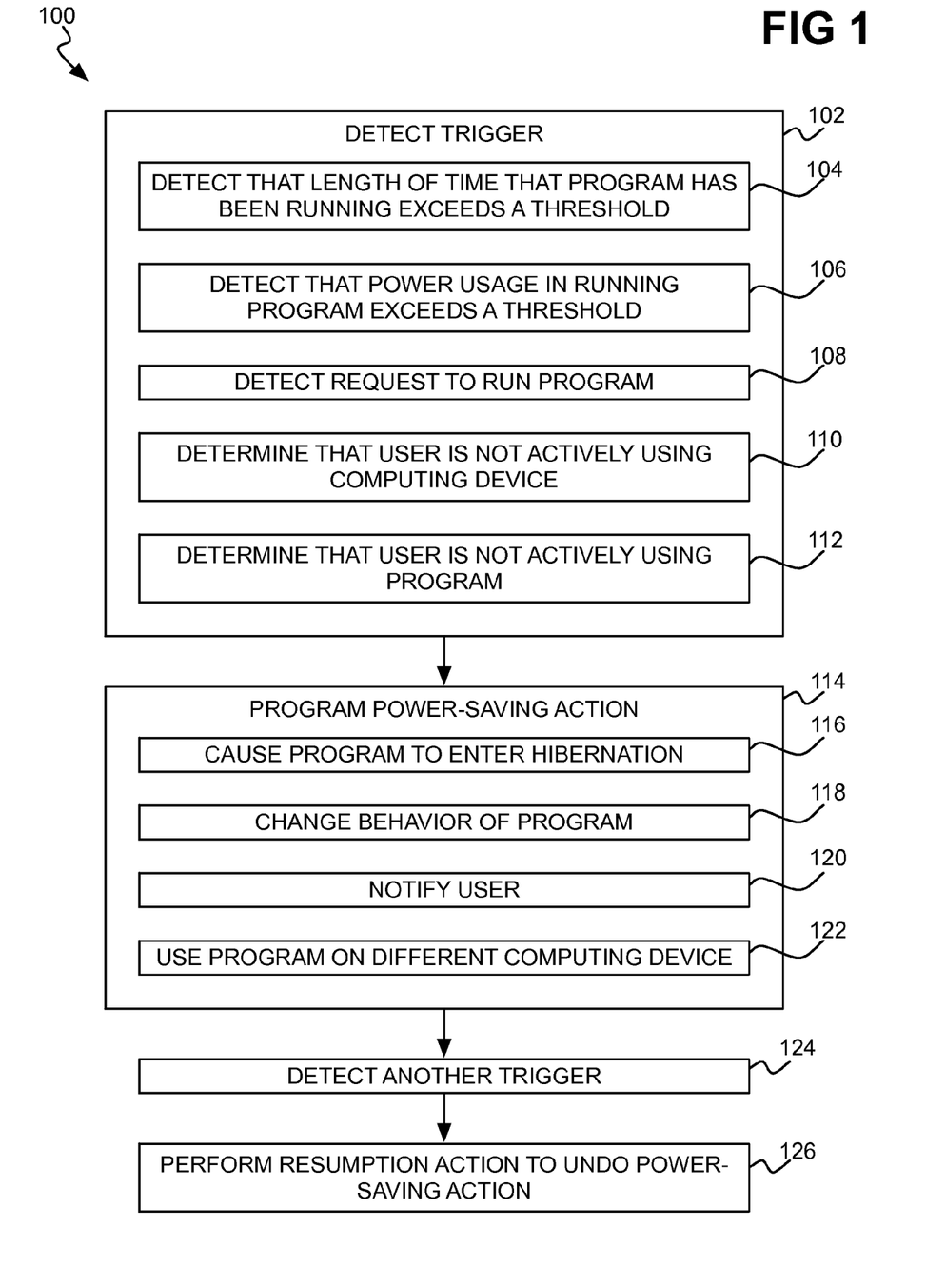
FIG. 1 is a flowchart of a method for a granular software-centric power management strategy, according to an embodiment of the disclosure.

FIG. 1 shows a method 100 for a granular software-centric power management strategy, according to an embodiment of the disclosure. A processor of a computing device or other type of system may perform the method 100. More specifically, the processor executes computer-readable power management code that implements the method 100. The processor performs the method 100 in relation to a computer program. This computer program can include the computer-readable power management code that implements the method 100, or a different computer program can include the computer-readable power management code.

The processor detects a trigger related to the power usage of the computing device (102). Such trigger detection in part 102 can include parts 104, 106, 110, and/or 112, among other forms of trigger detection. The processor can detect the trigger at a fine granularity in relation to a computer program running on the computing device, as in parts 104, 106, and 112, or at a coarse granularity in relation to the computing device as a whole irrespective of the computer program, as in part 110.

The processor may detect the trigger by detecting a length of time the computing device has been running a particular computer program (104). That is, after this computer program has been running for at least some length of time, the processor detects that the trigger has occurred. The processor thus detects the trigger in part 104 specifically in relation to a computer program running on a computing device, and not in relation to the computing device as a whole. However, part 104 relates to a scenario in which the processor does not directly monitor the power usage of the computing device attributable to the computer program. Rather, the processor in part 104 assumes that the computer program causes the computing device to use an excessive amount of power.

Figure 2:
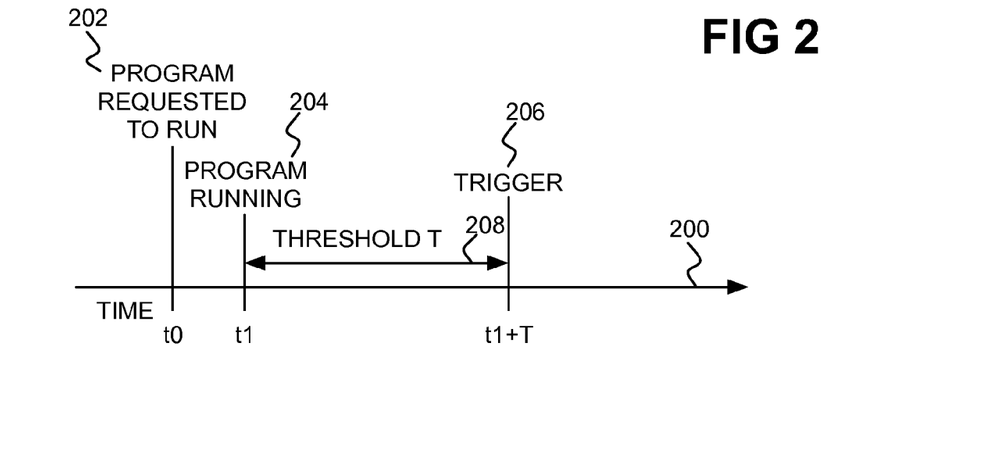
FIGS. 2, 3, 4, 5, and 6 are diagrams that illustrate example performance of different parts of the method of FIG. 1, according to varying embodiments of the disclosure.

FIG. 2 illustrates example performance of part 104, according to an embodiment of the disclosure. FIG. 2 shows a timeline 200 on which three events 202, 204, and 206 occur, at times t0, t1, and t1+T, respectively. At time t0, a user requests that the computing device run a computer program, to which the event 202 corresponds. For instance, a user may select the program in question within a graphical user interface (GUI) that the computing device provides. The user may achieve such selection by double-clicking an icon for the computer program within the GUI, as one example. A short period of time later, at time t1, the computing device begins to actively run the computer program, to which the event 204 corresponds.

At this time, the processor begins to detect whether a total time that the computer program has been running exceeds a threshold T, which corresponds to the line 208 in FIG. 2. That is, the processor begins to monitor a total length of time that the computer program has been running in a single contiguous session, to determine whether this total length of time is greater than the threshold T. At time t1+T, then, the processor detects the trigger corresponding to this scenario, as the event 206. That is, at time t1+T, the computing device has been running the computer program for the threshold period of time T. As such, the processor detects the trigger in relation to the computer program running on the computing device at time t1+T.

Referring back to FIG. 1, the processor can directly detect the trigger by detecting that the power usage of the computing device in running the computer program is higher than a threshold corresponding to unusual power usage (106). For example, on average the computing device may normally consume more power when running the computer program than when the device is not running the program, by a predetermined amount. If the computing device uses more than a certain threshold of power above this amount in running the computer program, then the processor detects the trigger.

Like in part 104, the processor detects the trigger in part 106 specifically in relation to a computer program running on a computing device, and not in relation to the computing device as a whole. However, in part 106 the processor directly detects the power usage of the computing device in running the computer program. By comparison, in part 104 the processor indirectly detects such power usage by monitoring the length of time that the computer program has been running on the computing device.

Figure 3:
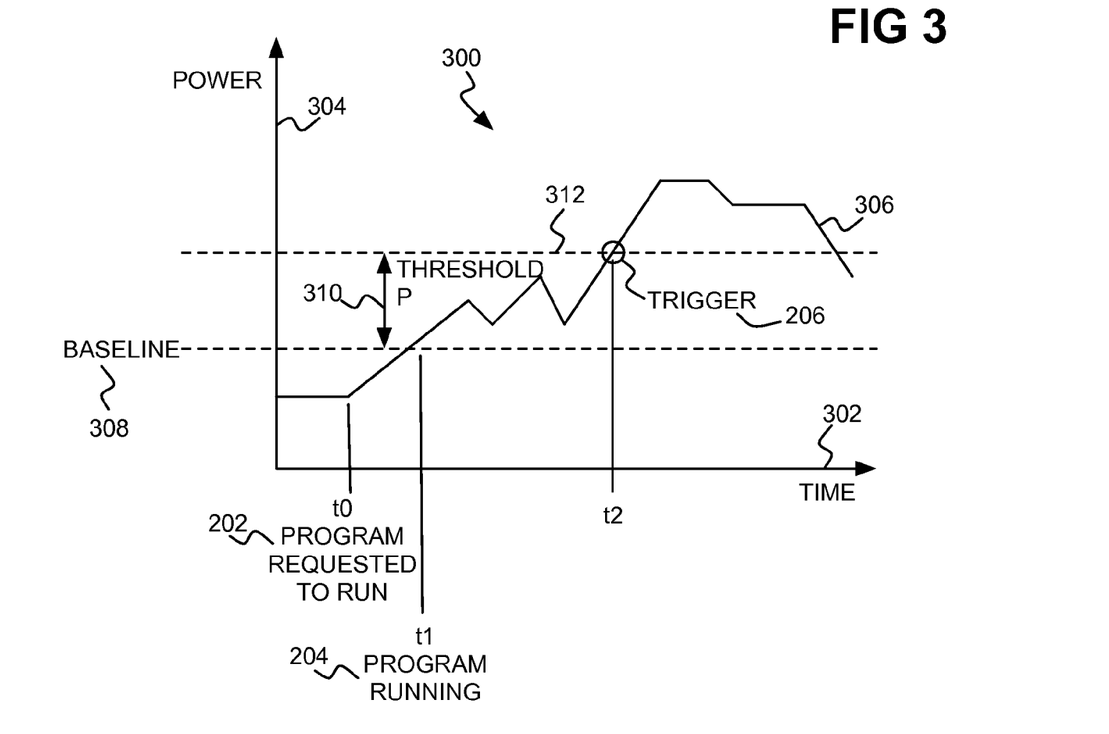

FIG. 3 illustrates example performance of part 106, according to an embodiment of the disclosure. FIG. 3 shows a graph 300 on which an x-axis 302 denotes time, and a y-axis 304 denotes the total power that the computing device currently consumes or uses. FIG. 3 thus shows a line 306 corresponding to a total power that the computing device currently consumes or uses, over time. The three events 202, 204, and 206 occur at times t0, t1, and t2, respectively. As in FIG. 2, at time t0, a user requests that the computing device run a computer program, to which the event 202 corresponds. A short period of time later, at time t1, the computing device begins to actively run the computer program, to which the event 204 corresponds.

At this time, the processor begins to monitor whether an amount of power that the computing device currently consumes, or uses, and that is attributable to the computer program, exceeds a threshold P, which FIG. 3 indicates via reference number 310. The processor at time t1 notes an amount of power that the computing device currently uses. FIG. 3 indicates this amount of power as a baseline amount of power 308.

The processor attributes any increases in this baseline amount of power 308 to the computer program that began running at time t1.

The processor detects, therefore, whether the power that the computing device currently consumes at any later point along the x-axis 302, minus the baseline amount of power 308, exceeds the threshold P. That is, the processor detects whether the power that the computing device currently consumes at any point along the x-axis 302 exceeds the amount of power 312. At time t2, the computing device uses an amount of power greater than the amount of power 312. The increase in power attributable to the computer program running on the computing device exceeds the amount of power 312 minus the baseline amount of power 308, and thus is now greater than the threshold P. As such, the processor detects the trigger in relation to the computer program running on the computing device at time t2.

The specific example of FIG. 3 relates to a technique that may be applicable to determining an amount of power that the computing device consumes or uses and that is attributable to a given computer program before the user requests any other computer program to run, and before the user requests any other computer program also running to stop running Once the user has requested another computer program to run, or once the user has requested another already running computer program to stop, monitoring cannot be achieved in accordance with the example of FIG. 3. This is because the total amount of power that the computing device currently uses, which the line 306 indicates, minus the baseline amount of power 308, is no longer attributable to just the computer program of interest.

Referring back to FIG. 1, in both parts 104 and 106, the processor detects a trigger in relation to a computer program after the computer program has been running on the computing device. In part 104, the processor permits the computer program to run the threshold length of time before detecting the trigger, and thus before concluding that the computer program is effectively causing the computing device to use too much power. In part 106, the processor permits the computer program to run so long as the computer program does not cause the computing device to use more than a threshold amount of power attributed to the computer program itself However, in another scenario, the processor can detect the trigger by simply detecting that a user has requested a computer program that is not already running on the computing device to run on the computing device (108). For example, the processor may know that a particular computer program always, or at least most of the time, causes a computing device to use too much power. Therefore, the processor detects, as the trigger, a request for running the computer program on the computing device, even before the computer program begins to run on the computing device.

Like in parts 104 and 106, the processor detects the trigger in part 108 specifically in relation to a computer program, and not in relation to a computing device as a whole. However, in part 108 the processor detects a request to run the computer program on the computing device. By comparison, the processor performs parts 104 and 106 while the computer program is running on the computing device.

The processor can also detect the trigger by determining that a user of the computing device is not actively using the computing device (110). For example, the processor may determine that the user has not provided input to the computing device after a threshold length of time. Such user-provided input can include using a pointing device like a mouse or track pad, as well as actuating a key of a keyboard, among other types of input. In this example, the processor directly determines whether the user is actively using the computing device.

As another example, the processor may further look up a user's schedule in part 110 to determine that the user is not actively using the computing device. For instance, if the user's schedule indicates that the user is in a meeting, then the processor may conclude that the user is not actively using (or should not actively be using) the computing device. In this example, the processor indirectly determines whether the user is actively using the computing device. In general, part 110 differs from parts 104, 106, and 108 in that the processor detects the trigger in part 110 not in specific relation to a computer program as in parts 104, 106, and 108, but rather in relation to a computing device as a whole.

Figure 4:
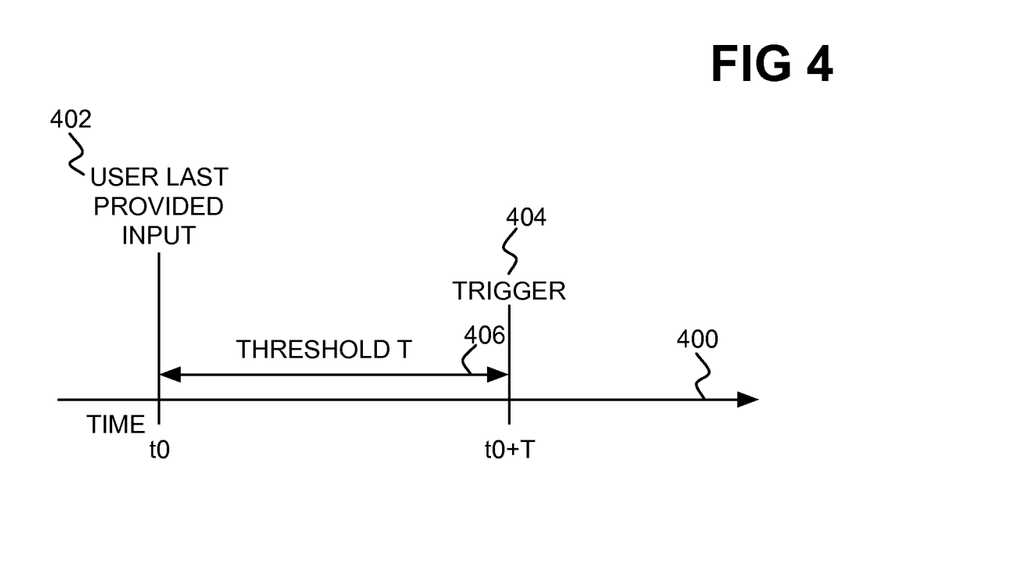

FIG. 4 illustrates example performance of part 110, according to an embodiment of the disclosure. FIG. 4 shows a timeline 400 on which two events 402 and 404 occur, at times t0 and t0+T, respectively. At time t0, the user last provided input to the computing device, to which the event 402 corresponds. For example, time t0 can correspond to the last time that the processor has detected that the user has pressed a key on a keyboard, has moved a mouse, has actuated a track pad, and so on.

At this time, the processor begins to detect whether a length of time since the user has last provided input to the computing device exceeds a threshold T, which corresponds to the line 406 in FIG. 2. That is, the processor begins to monitor the length of time in which the user is no longer actively using the computing device. At time t0+T, then, the processor detects the trigger corresponding to this scenario, as the event 404. That is, at time t0+T, the user has not provided input to the computing device for the threshold period of time T. As such, the processor detects the trigger.

Referring back to FIG. 1, the processor can detect the trigger by determining that a user of the computing device is not actively using the computer program of interest, but may still be using the computing device (112). The processor may determine that the user has not actively used the computer program for a threshold length of time. Once the user has not used the computer program for this threshold length of time, the processor detects the trigger.

For example, the processor may determine that the computer program has presented a number of items for the user to review, such as email or other types of messages, but that the user has not yet reviewed these items, indicating that the user is not actively attending to the program. In this example, the computer program may still have active focus within the GUI that the computing device presents. However, the user is not actively using the computer program.

As another example, the processor may determine that the user is actively using a different computer program than the computer program in question. In this example, the processor may determine that the computer program does not have active focus within the GUI that the computing device presents, but rather that another, different computer program has such active focus. In general, the processor detects the trigger in part 112 in specific relation to a computer program running on a computing device, and not in relation to the computing device as a whole, and in this respect is similar to parts 104 and 106.

Figure 5:
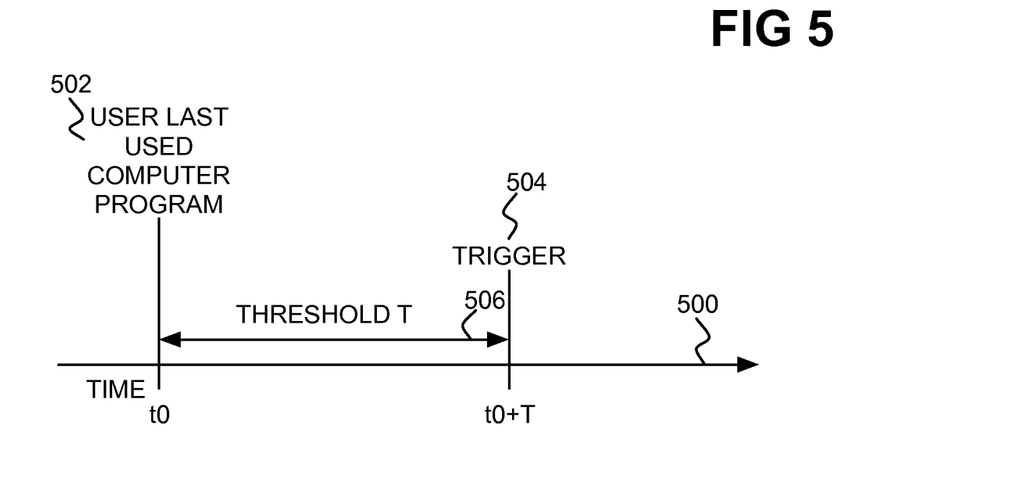

FIG. 5 illustrates example performance of part 112, according to an embodiment of the disclosure. FIG. 5 shows a timeline 500 on which two events 502 and 504 occur, at times t0 and t0+t, respectively. At time t0, the user last used the computer program in question, to which the event 502 corresponds. For example, time t0 can correspond to the last time that the user has accessed a message within the computer program, the last time that the computer program had focus within the GUI, and so on.

At this time, the processor begins to detect whether a length of time the user last used the computer program exceeds a threshold T, which corresponds to the line 506 in FIG. 5. That is, the processor begins to monitor the length of time in which the user is no longer actively using the computer program, regardless of whether the user is still using the computing device in another manner. At time t0+T, then, the processor detects the trigger corresponding to this scenario. That is, at time t0+T, the user has not actively used the computer program for the threshold period of time T. As such, the processor detects the trigger.

Referring back to FIG. 1, in response to detecting the trigger, the processor performs a power-saving action in relation to a computer program to reduce the power usage of the computing device (114). Where the processor has detected the trigger in relation to a computer program as in parts 104, 106, 108, and 112, the processor performs the power-saving action in relation to the same computer program in part 114. Where the processor has detected the trigger in relation to the computing device as a whole, as in part 110, the processor performs the power-saving action in relation to any computer program in part 114. For instance, the processor may select the computer program in relation to which the processor then performs part 114 as that which is causing the computing device to use the most power, as that which the user has not used for the longest period of time, and so on.

The power-saving action of part 114 is a granular power-saving action. Specifically, the processor performs part 114 without placing the computing device as a whole into a shut-off, sleep, standby, or hibernation state. Rather, the power management strategy is a granular software-centric approach in which the processor performs the power-saving action in relation to a computer program, and not to the computing device as a whole. In one embodiment, the processor performs the power-saving action in relation to a given computer program other than an operating system running on the computing device and that in conjunction with which the given computer program itself runs.

Performance of the power-saving action in part 114 can include parts 116, 118, 120, and/or 122. The processor can cause the computer program to enter into a hibernation state (116). As such, the computing device temporarily pauses execution of the computer program. However, other computer programs that may be running on the computing device are unaffected in their execution on the computing device. In this way, the computing device uses less power. the processor typically performs part 116 responsive to having detected the trigger in part 104, 106, 110, or 112.

On an even more granular level, the processor can just change the behavior of the computer program (118). The computer program still runs on the computing device, unlike in part 116, but causes the computing device to use less power in running the computer program. For instance, in relation to an email messaging computer program, the computer program may check for and retrieve new email messages on a less frequent basis.

The processor may notify a user of the computing device that the computer program is causing the computing device to use a higher-than-expected amount of power in running the program (120). The processor typically performs part 120 responsive to having detected the trigger in part 106. The user may take corrective actions to remedy this situation, or the user may otherwise perform an investigation and analysis to determine why the computing device is using more power than expected in running the computer program. The processor may alternatively perform the corrective actions automatically, without the user having to manually initiate these actions.

The processor may move the computer program to a different computing device (122). The processor typically performs part 122 responsive to part 108. A user may request that the computing device run a computer program in part 110, for instance, but instead the processor causes the computer program to run on a different computing device in part 122. As an example, the computer program may be a processor-intensive computer program that causes the processor of a computing device to use a relatively large amount of power. By causing the computer program to instead run on a different computing device, the computer program just virtually runs on the computing device in relation to which the user made his or her request.

In this way, the computing device on which the user made his or her request sends input regarding the computer program to the different computing device that is actually running the computer program. Correspondingly, the computing device that is actually running the computer program sends output from the computer program to the computing device on which the user made his or her request. In effect, the computing device on which the user has made his her or request to run the computer program acts as just an input/output terminal, whereas the different computing device actually executes the processor-intensive tasks of the computer program.

Figure 6:
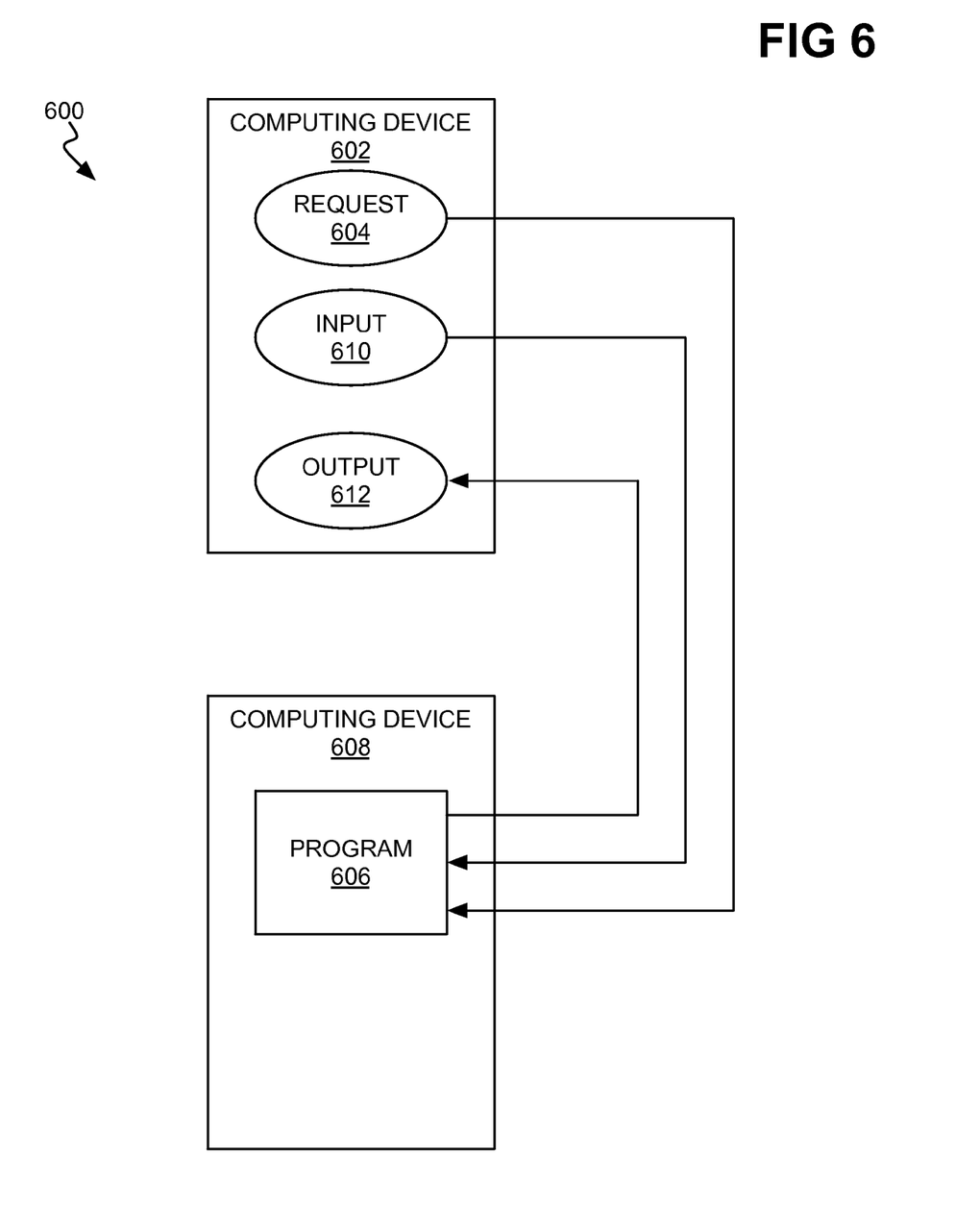

FIG. 6 shows illustrative performance of part 122 of the method 100 responsive to part 108 of the method 100, in relation to an example system 600, according to an embodiment of the disclosure. The system 600 includes two computing devices 602 and 608, each of which may be a desktop computer, a laptop computer, or another type of computer or computing device. The computing devices 602 and 608 can communicate with one another, such as over a network.

The computing device 602 receives a request 604 to run a particular computer program 606 on the computing device 602, such as from a user. Pursuant to part 108, the processor detects this request 604 as a trigger. Pursuant to part 122, the processor then causes the computing device 608 to run the computer program 606, instead of the computing device 602. That the computing device 608 runs the computer program 606 instead of the computing device 602 may be transparent to the user that made the request 604. That is, the user may or may not be aware that the computing device 608, instead of the computing device 602, is running the computer program 606.

In any case, the computing device 602 receives input 610 that pertains to the computer program 606, such as from the user. The computing device 602 transmits this input 610 to the computer program 606 running on the computing device 608. Likewise, the computing device 608 transmits output 612 from the computer program to the computing device 602 for display to the user. In this way, the user interacts with the computer program 606 as if the program 606 were running on the computing device 602, when in fact the computer program 606 is running on the computing device 608.

Referring back to FIG. 1, once the processor has performed a power-saving action in part 114 responsive to detecting a trigger in part 102, the processor may detect another trigger (124). The second trigger relates to a user explicitly or implicitly wanting the computer program in question to exit the power-conserving mode that resulted from the power-saving action that the processor performed in part 114. For example, if the processor had determined in part 110 that the user was not actively using the computing device, the second trigger may be that the user is now actively using the computing device. As another example, if the processor had previously determined in part 112 that the user was not actively using the computer program, the second trigger may be that the user is now actively using the computer program.

As such, responsive to the second trigger, the processor performs a resumption action in relation to the computer program to undo the power-saving action that the processor performed in part 114 (126). For example, if the processor had caused the computer program to enter a hibernation state in part 116, then the processor may cause the computer program to exit this state in part 126. As another example, if the processor had changed the behavior of the computer program in part 118, then the processor undoes this behavior change in part 126.

The method 100 thus provides for a granular software-centric approach to power management. However, the computing device performing the method 100 can result in the computing device using more power than if the computing device were not perform the method 100. Therefore, the computing device should utilize less power in performing the method 100 than the amount of power that the computing device conserves as a result of performing the method 100, so that there is a net reduction in power usage. Stated another way, detecting the trigger in part 102 and performing the power-saving action in part 114 should require less power than the reduction in power usage that the power-saving action achieves.

A trigger can be defined in a number of different ways, such as pursuant to a policy. Such a policy may specify an override condition, which overrides performing the power-saving action in part 114 responsive to detecting the trigger in part 102. For instance, the policy may afford certain classes of users the ability to override the performance of power-savings actions, or the policy may provide users the ability to override the performance of power-savings actions at certain times or in certain locations.

Figure 7:
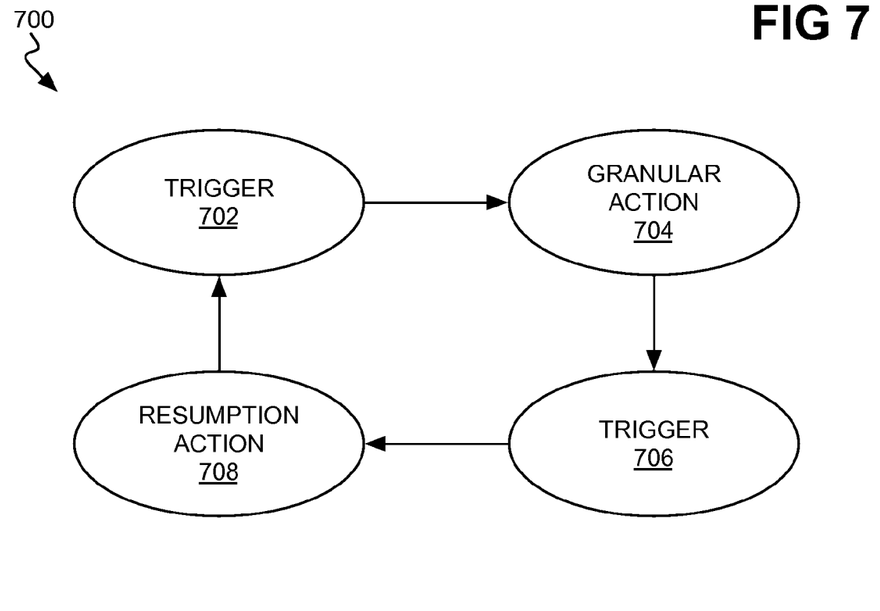
FIG. 7 is a state diagram that illustratively summarizes a granular software-centric power management strategy, according to an embodiment of the disclosure.

FIG. 7 shows a state diagram 700 that illustratively summarizes the method 100, according to an embodiment of the disclosure. The state diagram 700 includes four states 702, 704, 706, and 708. The state 702 corresponds to the processor detecting a trigger in part 102. The state diagram 700 proceeds from the state 702 to the state 704, which corresponds to the processor performing a granular, software-centric power-saving action in part 114. The state diagram 700 proceeds from the state 704 to the state 706, which corresponds to the processor detecting another trigger in part 124. The state diagram 700 proceeds from the state 706 to the state 708, which corresponds to the processor performing a resumption action to undo the granular, software-centric power-saving action in part 708. From the state 708, the state diagram 700 can proceed back to the state 702.

At the state 704, the computing device in relation to which the processor performs the granular, software-centric power-saving action uses less power than the device does at the state 708. Nevertheless, a user can still use the computing device while the computing device is using such a lesser amount of power. This is because the power-saving action pertains to a computer program, and not to the computing device as a whole. As such, the method 100 is advantageous because it still provides the user with the ability to use the computing device, unlike power-saving techniques that are coarser in granularity and that pertain to the computing device as a whole.

Figure 8:
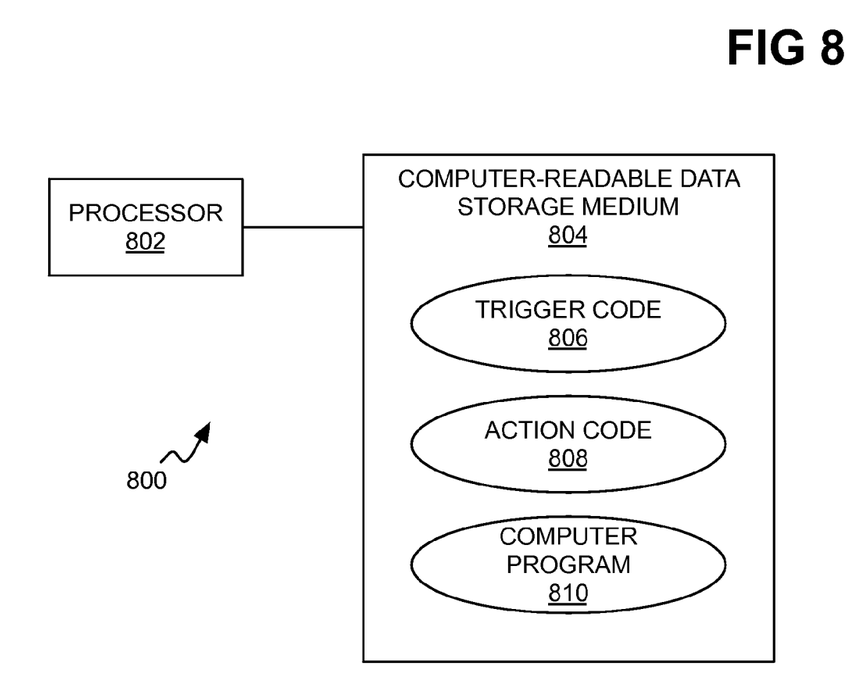
FIG. 8 is a diagram of a system that implements a granular software-centric power management strategy, according to an embodiment of the disclosure.

FIG. 8 shows a system 800 that implements the granular software-centric power management strategy of the method 100, according to an embodiment of the disclosure. The system 800 can be or include a computing device. The computing device may be a computer, such as a desktop or a laptop computer, or another type of computing device, such as a mobile device like a smartphone. The computing device may have its own source of electrical power that requires periodic recharging, such as a battery, or the computing device may rely exclusively on external electrical power, such as the electrical power that plugging the computing device into an electrical outlet provides.

The system 800 includes at least a processor 802 and a computer-readable data storage medium 804. The computer-readable data storage medium 804 includes trigger computer-readable code 806, action computer-readable code 808, and a computer program 810. The processor 802 executes the computer-readable code 806 and 808 and the computer program 810 from the computer-readable data storage medium 804. The computer program 810 can include the computer-readable code 806 and/or 808.

Alternatively, the computer-readable code 806 and/or 808 may be part of a different computer program other than the computer program 810.

The processor 802 executes the trigger computer-readable code 806 to perform parts 102 and 124 of the method 100, in relation to the computer program 810, or in relation to the system 800 as a whole. For instance, the processor 802 can perform parts 104, 106, 108, and 112 in relation to the computer program 810. By comparison, the processor can perform part 110 in relation to the system 800 as a whole.

The processor 804 executes the action computer-readable code 808 to perform parts 114 and 126 of the method 100, in relation to just the computer program 810. In this respect, the disclosed power management strategy is granular and software-centric. The strategy is granular because the processor 804 applies the strategy to just the computer program 810, and not to the system 800 as a whole. The strategy is software-centric likewise because the processor 804 applies the strategy directly to the computer program 810 running on the system 800, and not directly to the hardware of the system 800.

Those of ordinary skill within the art can appreciate that a system, method, or computer program product may embody aspects of the present disclosure. Accordingly, aspects of the embodiments of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product that one or more computer readable medium(s) embody. The computer readable medium(s) may embody computer readable program code.

Those of ordinary skill within the art can utilize any combination of one or more computer readable medium(s). The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. An appropriate medium may transmit program code embodied on a computer readable medium. Such appropriate media include but are not limited to wireless, wireline, optical fiber cable, RF, etc., or any suitable combination of the foregoing.

In general, a computer program product includes a computer-readable medium on which one or more computer programs are stored. One or more processor of one or more hardware devices execute the computer programs from the computer-readable medium to perform a method. For instance, the processors may perform one or more of the methods that have been described above.

The computer programs themselves include computer program code. Those of ordinary skill within the art may write computer program code for carrying out operations for aspects of the present disclosure in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, any type of network may connect the remote computer to the user's computer. Such networks include a local area network (LAN) or a wide area network (WAN), or a connection may to an external computer (for example, through the Internet using an Internet Service Provider).

The detailed description has presented aspects of the present disclosure with reference to flowchart illustrations and/or block diagrams of methods, apparatus (systems) and computer program products according to embodiments of the disclosure. Those of ordinary skill within the art can understand that computer program instructions can implement each block of the flowchart illustrations and/or block diagrams, and combinations of blocks in the flowchart illustrations and/or block diagrams. Providing these instructions to a processor of a general purpose computer, special purpose computer, or other programmable data processing apparatus to produce a machine, can result in execution of the instructions via the processor of the computer or other programmable data processing apparatus, to create means for implementing the functions/acts specified in the flowchart and/or block diagram block or blocks.

A computer readable medium may also store these instruction to direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Those of ordinary skill within the art may also load the computer program instructions onto a computer, other programmable data processing apparatus, or other devices to cause the computer, other programmable apparatus or other devices, to perform a series of operational steps. The result is a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, execution of two blocks shown in succession may, in fact, occur substantially concurrently, or sometimes in the reverse order, depending upon the functionality involved. Special purpose hardware-based systems that perform specified functions or acts, or combinations of special purpose hardware and computer instructions, can implement each block of the block diagrams and/or flowchart illustration, and combinations of blocks in the block diagrams and/or flowchart illustration.

Although the detailed description has presented specific embodiments, those of ordinary skill in the art can appreciate that they can substitute any arrangement calculated to achieve the same purpose for the specific embodiments shown. This application thus covers any adaptations or variations of embodiments of the present disclosure. As such and therefore, only the claims and equivalents thereof limit this disclosure.

We claim:

1. A method comprising:

detecting, by a processor, a first trigger;

responsive to detecting the first trigger, performing a power-saving action in relation to a computer program to reduce the power usage of a computing device without placing the computing device as a whole into a shutoff, sleep, standby, or hibernation state;

detecting, by the processor, a second trigger related to the power usage of the computing device caused by the computer program; and responsive to detecting the second trigger, performing a resumption action in relation to the computer program to undo the power-saving action that has been performed, wherein the power-saving action is a strictly software-oriented action, wherein detecting the first trigger comprises determining that a user of the computing device is not actively using the computer program, and wherein determining that the user is not actively using the computer program comprises determining that a number of items presented by the computer program have not yet been reviewed by the user.

2. The method of claim 1, wherein an amount of power of the computing device used in detecting the first trigger and performing the power-saving action is less than a reduction of the power usage of the computing device that results from performing the power-saving action, such that performance of the method results in a net power usage reduction.

3. The method of claim 1, wherein one or more of detecting the first trigger and performing the power-saving action are performed by the computer program itself.

4. The method of claim 1, wherein one or more of detecting the first trigger and performing the power-saving action are performed by another, different computer program.

5. The method of claim 1, wherein the first trigger is defined pursuant to a policy comprising an override condition in which performing the power-saving action in response to detecting the first trigger can be overridden so that the power-saving action is not performed even when the first trigger has been detected.

6. The method of claim 1, wherein determining that the number of items presented by the computer program have not yet been reviewed by the user comprises determining that the number of items presented by the computer program have not yet been reviewed by the user even though the user is otherwise using the computing device.

* * * * *